United States Patent

[11] 3,600,594

| [72] | Inventor | John F. Moore<br>Plainfield, N.J. |
|---|---|---|
| [21] | Appl. No. | 782,024 |
| [22] | Filed | Dec. 9, 1968 |
| [45] | Patented | Aug. 17, 1971 |
| [73] | Assignee | Lockheed Aircraft Corporation<br>Burbank, Calif. |

[54] FIBER OPTICS PULSE WIDTH MODULATOR
8 Claims, 3 Drawing Figs.

[52] U.S. Cl. .................................................. 250/227,
235/181, 250/237
[51] Int. Cl. ...................................................... H01j 5/16
[50] Field of Search ............................................ 250/237 G,
227; 235/181

[56] References Cited
UNITED STATES PATENTS

| 3,483,386 | 12/1969 | Jernigan ......................... | 250/216 |
| 3,441,724 | 4/1969 | Taylor ........................... | 235/181 |
| 3,273,458 | 9/1966 | Kohler ........................... | 250/227 |
| 3,273,072 | 9/1966 | Koester ........................... | 250/227 |
| 3,189,746 | 6/1965 | Slobodin ....................... | 250/227 |

OTHER REFERENCES
Vectors, Vol. 7, No. 4, 1965, pp. 10—13, 250/227

*Primary Examiner*—Rodney D. Bennett, Jr.
*Assistant Examiner*—Joseph G. Baxter
*Attorneys*—George C. Sullivan and Billy G. Corber ABSTRACT: An optical pulse width modulator having a spiral stack of optical fibers providing a plurality of independent channels of different length for the passage of light. A suitable light source is intensity modulated in accordance with an applied electronic signal waveform and the light directed through the stack of optical fibers. The light emerging from the fibers is correlated with a waveform pattern in an optical grating and detected photoelectrically as a width modulated signal representing the correlation function between the applied electronic signal and the optical grating.

PATENTED AUG 17 1971 3,600,594
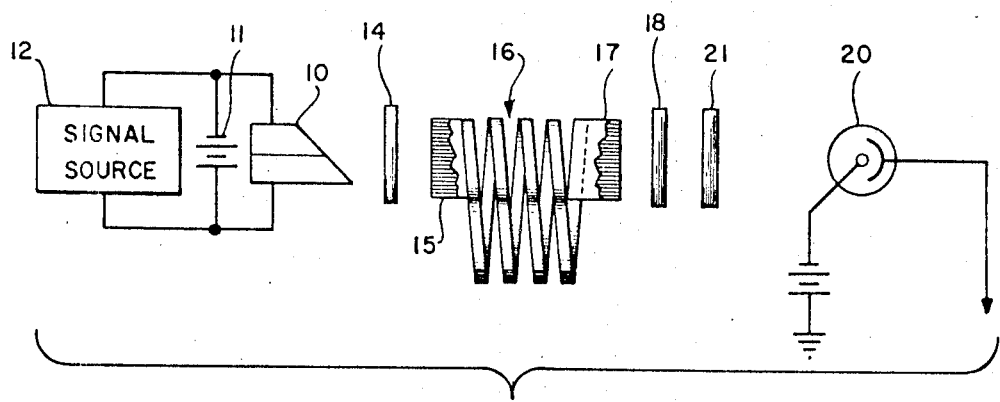
FIG_1
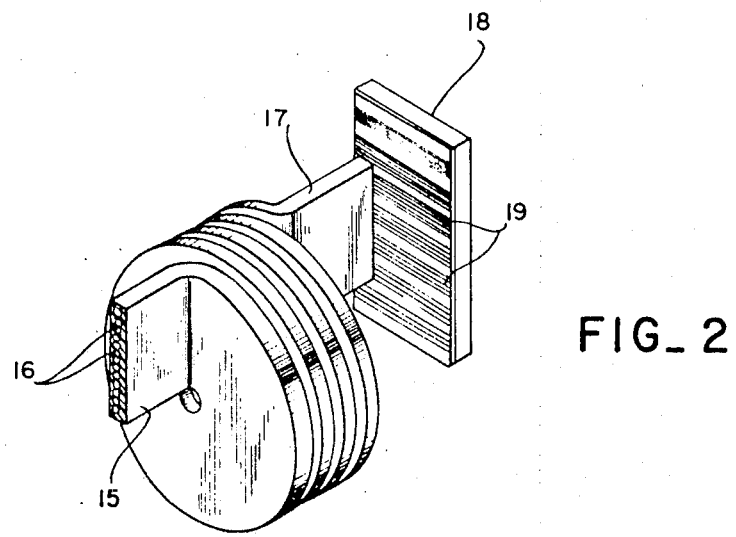
FIG_2
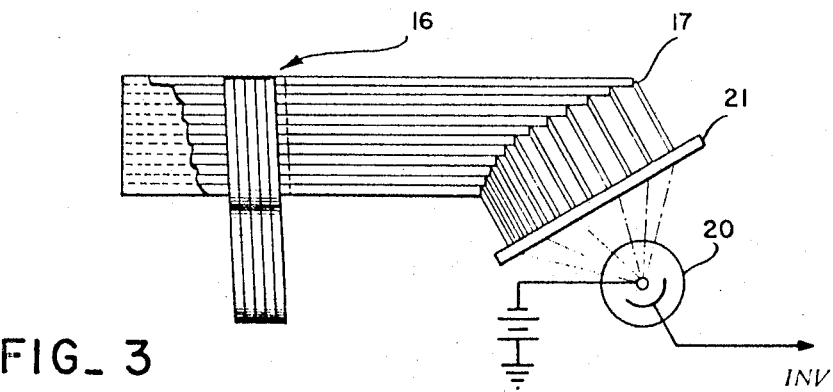
FIG_3
INVENTOR.
JOHN F. MOORE
BY George C. Sullivan, Agent
Billy G. Carher
Attorney

FIBER OPTICS PULSE WIDTH MODULATOR

BACKGROUND OF THE INVENTION

This invention relates generally to processing of electronic signals and more particularly to a fiber optics device for correlating and time modulating frequency coded electronic signal pulses.

In radar and pulse code communications systems, pulse compression and expansion and pulse correlation techniques are commonly employed in signal processing to improve system performance. An optical technique which utilizes the acoustic properties of matter for pulse expansion and compression is taught, for example, in U.S. Pat. no. 3,189,746. Electromagnetics is also commonly used for pulse width modulation. These techniques, however, involve rather complex hardware and have limited bandwidth capability. By making use of fiber optics as taught herein, higher compression and expansion ratios may be obtained and signals of wider bandwidth may be processed than are possible using the above-mentioned prior art techniques.

SUMMARY OF THE INVENTION

It is an object of this invention to provide a spiral stack of optical fibers forming independent channels of different length through which electronic signal modulated light may pass and be correlated with an optical grating for compression and/or expansion processing.

Another object of this invention is to provide a fiber optics pulse width modulator which is compact and optically efficient.

Still another object of this invention is to provide a fiber optics pulse width modulator which is readily adaptable for processing different code signals and for handling wide signal bandwidths limited essentially only by the response rate of the system light source.

Further and other objects will become apparent from the following detail description, especially when considered together with the accompanying drawing wherein like numerals refer to like parts.

BRIEF DESCRIPTION OF THE DRAWING

FIG. 1 is a schematic side view of the fiber optics pulse width modulator system of the invention;

FIG. 2 is a perspective view showing the spiral stack of optical fibers and optical grating employed in the FIG. 1 device; and FIG. 3 is a schematic side view showing a modification of the pulse width modulator wherein the optical grating is formed by variations in length between optical fibers at the outlet of the spiral stack.

DESCRIPTION OF THE PREFERRED EMBODIMENTS

Referring to FIGS. 1 and 2, a high response rate light source 10 such as a gallium arsenide light diode is biased by a suitable source of electrical potential as represented by battery 11 just below the level at which light is emitted. An electronic signal source 12 coupled to light source 10 modulates the source to emit light at an intensity proportional to the magnitude of the positive portions of the applied signal. The waveform of the applied electronic signal from source 12 is thus essentially replicated by the light output from modulated light source 10.

While any high response rate light source may be employed in the system herein described, a laser source such as the gallium arsenide light diode is preferred.

The light output from source 10 is beam-shaped by a suitable lens or diffusing screen 14 to illuminate with the same signal the entire inlet end 15 of a spiral stack of optical fibers 16 serving as a width modulator. The optical fibers in the stack may each typically have a cross-sectional area in the order of $10^{16}$ cm.² and be sufficient in number in the FIG. 1 system to provide at least two fibers for each cycle of the highest frequency involved in the applied electronic signal. The fibers are conventionally coated except at the ends to minimize light leakage and attenuation along the length thereof and placed one on the other to form the spiral stack shown best in FIG. 2. Any suitable means such as a resin adhesive may be used to hold the spiral assembly of fibers together.

The light applied to the spiral stack through inlet end 15 eventually exits at the opposite outlet end 17 and is intercepted by a correlator mask or plate 18 having an optical grating of alternate opaque and transparent strips 19 representing a desired waveform pattern contained in the applied electronic signal. Plate 18 is preferably constructed photographically in essentially the same way as the correlator mask described in U.S. Pat. No. 3,189,746.

Light passing correlator plate 18 is made to focus on a photodetector 20 through a lens 21 and the applied signal is thereby reconverted into an electronic signal.

The spiral stack of optical fibers provides a plurality of independent channels each of different length for the passage of light. These optical fibers serve as delay lines of successively different delay times. The modulated light from light source 10 contains a signal spread out in time which, on passage through the spiral stack of fibers, is operated on to provide a light image at the output of the stack which is a reproduction of the applied electronic signal, only spread out in space rather than time. This signal can in an instant be put in physical correspondence with the waveform pattern contained in the optical grating on correlator plate 18 for pulse compression. Hence, a correlation between the applied electronic signal waveform and the desired waveform pattern contained on the optical grating passes the correlator plate 18 and is made to focus at photodetector 20 for reconversion to an electrical signal. Where the optical grating on correlator plate 18 corresponds with the applied electronic signal which modulates light source 10, the output signal obtained at photodetector 20 is a time-compressed replica of the applied electronic signal; the compression ratio being a function of the applied signal bandwidth times the signal delay in the compressor.

The same device is capable of functioning as an optical pulse expander. A brief flash of light representing a short duration pulse applied to the input of the optical fibers results in a long duration pulse at the output which is made up of many of the applied short flashes occurring in sequence. The dark bars on correlator plate 18 block some of these flashes to produce the desired frequency coding.

The number of optical fibers per applied signal code cycle can be reduced one-half or more with the modification shown in FIG. 3 wherein light output end 17 of fiber stack 16 is tapered by length differences between optical fibers to form irregularities simulating the code pattern on correlator plate 18 in the FIG. 1 device. By this means, the optical grating is formed integral with the outlet end of fiber stack 16. The compressor is thereby given a fixed code at the output, but one which substantially reduces the number of optical fibers required for system operation by omitting those which would normally be blocked by the dark bars on correlator plate 18. The tapered outlet end 17 of FIG. 3, exposing different lengths of the ends of the optical fibers to provide the desired optical grating, is observed by photodetector 20 through focusing lens 21 generally normal to the plane of the taper as necessary for obtaining correlation between the optical grating and the light output from the stack of fibers.

The pulse width modulator unit represented by the spiral stack of optical fibers may be used in various signal processing systems and is not limited to use in the particular system disclosed. While specific embodiments of the system have been shown and described for illustrative purposes to aid in understanding the invention, it is to be understood that certain alterations, modifications and substitutions may be made to the instant disclosure without departing from the teachings of the invention as defined by the spirit and scope of the appended claims.

I claim:

1. An optical pulse width modulator for processing electronic signals comprising, a light source responsive to applied electronic signals for generating light energy intensity modulated to replicate the applied signal waveform, a spiral stack of optical fibers providing a plurality of independent channels of different length for the passage of light therethrough, said fibers terminating at one end to form a light inlet and at the opposite end to form a light outlet for each channel, lens means illuminating said inlet for each channel with the intensity modulated light from said source, an optical grating at said outlet for each channel representing a desired waveform pattern contained in said applied electronic signal, and photodetector means for sensing correlation between said grating means and the light intensity pattern emerging from said channels.

2. A device as defined in claim 1 wherein at least one channel is provided for each cycle in the desired output signal.

3. A device as defined in claim 1 wherein said light source is a gallium arsenide diode.

4. A device as defined in claim 1 wherein said light source is a laser biased to lase only with the positive portions of the applied electronic signal.

5. A device as defined in claim 1 wherein said optical fibers are stacked one on the other in a single row.

6. A device as defined in claim 1 wherein said optical grating is formed by variations in length between said optical fibers at said outlet.

7. A device as defined in claim 1 wherein the outlet end of said spiral stack is planar and said optical grating is formed on a plate physically separate from the optical fibers.

8. In an optical pulse width modulator for processing electronic signals, a spiral stack of optical fibers providing a plurality of independent channels of different length for the passage of light therethrough, said fibers terminating at one end to form a light inlet and at the opposite end to form a light outlet for each channel.